(12) United States Patent
Okajima et al.

(10) Patent No.: US 11,913,383 B2
(45) Date of Patent: Feb. 27, 2024

(54) THERMAL BARRIER COATED COMPONENT AND METHOD FOR PRODUCING THERMAL BARRIER COATED COMPONENT

(71) Applicant: Mitsubishi Power, Ltd., Kanagawa (JP)

(72) Inventors: Yoshifumi Okajima, Tokyo (JP); Masahiko Mega, Tokyo (JP); Taiji Torigoe, Tokyo (JP); Atsushi Moriwaki, Tokyo (JP); Hiroshi Makigano, Tokyo (JP); Koichi Tanimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 142 days.

(21) Appl. No.: 17/615,895

(22) PCT Filed: Jun. 12, 2020

(86) PCT No.: PCT/JP2020/023137
§ 371 (c)(1),
(2) Date: Dec. 2, 2021

(87) PCT Pub. No.: WO2021/002173
PCT Pub. Date: Jan. 7, 2021

(65) Prior Publication Data
US 2022/0316401 A1 Oct. 6, 2022

(30) Foreign Application Priority Data
Jul. 2, 2019 (JP) .................................. 2019-123678

(51) Int. Cl.
*F02C 7/24* (2006.01)
*C23C 4/073* (2016.01)
(Continued)

(52) U.S. Cl.
CPC ................ *F02C 7/24* (2013.01); *C23C 4/073* (2016.01); *C23C 4/134* (2016.01); *F01D 5/288* (2013.01);
(Continued)

(58) Field of Classification Search
CPC ...... F01D 5/288; F01D 17/085; F01D 21/003; C23C 4/073; C23C 4/134; C23C 4/137;
(Continued)

(56) References Cited

U.S. PATENT DOCUMENTS 8,033,722 B2 10/2011 Kulkarni et al.
8,586,169 B2 11/2013 Namba et al.
(Continued)

FOREIGN PATENT DOCUMENTS

CN 101405423 4/2009
CN 103459998 12/2013
(Continued)

OTHER PUBLICATIONS

International Search Report dated Sep. 1, 2020 in International (PCT) Application No. PCT/JP2020/023137.
(Continued)

*Primary Examiner* — Topaz L. Elliott
*Assistant Examiner* — Jesse M Prager
(74) *Attorney, Agent, or Firm* — Wenderoth, Lind & Ponack, L.L.P.

(57) ABSTRACT

The present invention provides a thermal barrier coated component, monitoring or evaluation of the soundness of which is able to be adequately carried out on the basis of the thermal boundary conditions that are detected by a sensor. A thermal barrier coated component according to the present invention comprises: a base material; a first bond coat layer that is a metal bonding layer formed on the base material; a sensor unit that comprises a sensor and a conductive wire,
(Continued)

which are formed on the first bond coat layer; a second bond coat layer that is formed on the first bond coat layer so as to cover at least the sensor unit, while having a surface roughness higher than that of the first bond coat layer; and a top coat layer that is formed on the second bond coat layer.

8 Claims, 4 Drawing Sheets

(51) Int. Cl.
    *C23C 4/134*     (2016.01)
    *G01N 25/18*     (2006.01)
    *F01D 5/28*     (2006.01)
    *F01D 17/08*     (2006.01)
    *F01D 21/00*     (2006.01)

(52) U.S. Cl.
    CPC .......... *F01D 17/085* (2013.01); *F01D 21/003* (2013.01); *G01N 25/18* (2013.01); *F05D 2220/32* (2013.01); *F05D 2230/312* (2013.01); *F05D 2230/90* (2013.01); *F05D 2260/231* (2013.01); *F05D 2270/80* (2013.01); *F05D 2300/2118* (2013.01); *F05D 2300/514* (2013.01); *F05D 2300/611* (2013.01)

(58) Field of Classification Search
    CPC ........... F05D 2230/312; F05D 2230/90; F05D 2260/231; F05D 2270/80; F05D 2300/611; F05D 2300/2118; F05D 2300/514
    See application file for complete search history.

(56) References Cited

U.S. PATENT DOCUMENTS

| | | | |
|---|---|---|---|
| 8,662,746 | B2 | 3/2014 | Subramanian et al. |
| 8,961,007 | B2 | 2/2015 | Subramanian et al. |
| 2005/0123783 | A1* | 6/2005 | Gregory ................ C23C 28/345 |
| | | | 428/617 |
| 2007/0223560 | A1 | 9/2007 | Boese et al. |
| 2007/0281103 | A1 | 12/2007 | Khan et al. |
| 2008/0145643 | A1* | 6/2008 | Reynolds ................ C23C 24/06 |
| | | | 427/261 |
| 2009/0176059 | A1 | 7/2009 | Namba et al. |
| 2010/0027584 | A1 | 2/2010 | Kulkarni et al. |
| 2011/0222582 | A1 | 9/2011 | Subramanian et al. |
| 2012/0236899 | A1 | 9/2012 | Subramanian et al. |
| 2016/0222804 | A1 | 8/2016 | Ahmad et al. |
| 2017/0122561 | A1* | 5/2017 | Nagaraj ................ C23C 28/028 |
| 2021/0025592 | A1 | 1/2021 | Nagaraj |

FOREIGN PATENT DOCUMENTS

| | | | |
|---|---|---|---|
| CN | 105593472 | | 5/2016 |
| CN | 107043935 | | 8/2017 |
| EP | 2857638 A1 * | 4/2015 | ........... C23C 14/221 |
| JP | 11-211576 | | 8/1999 |
| JP | 2007-57346 | | 3/2007 |
| JP | 2013-518215 | | 5/2013 |
| JP | 2014-511957 | | 5/2014 |

OTHER PUBLICATIONS

Office Action dated Jan. 4, 2023 in Japanese Patent Application No. 2019-123678, with English-language translation.

Office Action dated Oct. 28, 2023 in corresponding Chinese Patent Application No. 202080041888.7 with partial English-language translation (17 pages).

* cited by examiner

THERMAL BARRIER COATED COMPONENT AND METHOD FOR PRODUCING THERMAL BARRIER COATED COMPONENT

TECHNICAL FIELD

The present disclosure relates to a thermal barrier coated component and a method for producing the thermal barrier coated component.

BACKGROUND ART

In the related art, for example, a thermal barrier coating (TBC) is coated on components, such as gas turbine components, which are used in a high-temperature environment. A technique is known in which a sensor that detects thermal boundary conditions for performing soundness monitoring (health monitoring) and various evaluations on thermal barrier coated components coated with such a thermal barrier coating is provided inside the thermal barrier coating. For example, PTL 1 discloses a damage evaluation system in which, for a thermal barrier coated component having a thermal barrier ceramic layer (top coat layer) coated on a metal base material and a metal intermediate layer (bond coat layer), temperature sensors are provided on a bonding interface between the thermal barrier ceramic layer and the metal intermediate layer, a bonding interface between the metal intermediate layer and the metal base material, and an outer surface of the metal base material.

CITATION LIST

Patent Literature

[PTL 1] Japanese Unexamined Patent Application Publication No. 2007-57346

SUMMARY OF INVENTION

Technical Problem

However, in a case where a sensor is disposed on an interface between the top coat layer and the bond coat layer, there is a possibility that the sensor cannot withstand long-term use in a high-temperature environment due to a heat elongation difference (difference in coefficient of thermal expansion) between the top coat, and the sensor and a conductive wire of the sensor and that the top coat layer may be delaminated. For this reason, there is concern that the soundness of the thermal barrier coated component cannot be appropriately monitored or evaluated.

At least one embodiment of the present invention has been made in view of the above, and an object thereof is to provide a thermal barrier coated component capable of appropriately monitoring or evaluating soundness on the basis of thermal boundary conditions detected by a sensor.

Solution to Problem

In order to solve the above-described problems and achieve the object, the present invention includes a base material, a first bond coat layer that is a metal bonding layer formed on the base material, a sensor unit disposed on the first bond coat layer and including a sensor and a conductive wire, a second bond coat layer that is formed on the first bond coat layer so as to cover at least the sensor unit and has a surface roughness higher than that of the first bond coat layer, and a top coat layer that is formed on the second bond coat layer.

By virtue of this configuration, the second bond coat layer having a surface roughness higher than that of the first bond coat layer is formed on the first bond coat layer so as to cover the sensor unit, and the top coat layer is formed on the second bond coat layer. For this reason, the degree of adhesion between the second bond coat layer and the top coat layer can be improved. As a result, even when there is a heat elongation difference between the sensor and the conductive wire of the sensor, and the top coat layer, it is possible to prevent the top coat layer from being delaminated from the second bond coat layer and to realize long-term use of the thermal barrier coated component in a high-temperature environment. Therefore, according to the present invention, it is possible to obtain the thermal barrier coated component capable of appropriately monitoring or evaluating soundness on the basis of the thermal boundary conditions detected by the sensor.

Additionally, it is preferable that the second bond coat layer includes more pores than the first bond coat layer. By virtue of this configuration, the surface roughness of the second bond coat layer can be made higher than the surface roughness of the first bond coat layer.

Additionally, it is preferable that the first bond coat layer has a porosity of 0% by volume or more and 5.0% by volume or less, and that the second bond coat layer has a porosity of 0.1% by volume or more and 10.0% by volume or less.

By virtue of this configuration, the porosity of the second bond coat layer can be set to an appropriate value, the surface roughness of the second bond coat layer can be appropriately increased, and the degree of adhesion to the top coat layer can be improved.

Additionally, it is preferable that the sensor is any one of a thermocouple sensor, a heat flux sensor, a strain sensor, and a sensor that detects a crack generated in the first bond coat layer, the second bond coat layer, and the top coat layer.

By virtue of this configuration, the thermal boundary conditions for the thermal barrier coated component can be appropriately detected by the sensor.

Additionally, it is preferable that the second bond coat layer is thinner than the first bond coat layer. By virtue of this configuration, even when the second bond coat layer is provided, it is possible to suppress increase of thickness of the entire layers formed on the base material.

In order to solve the above-described problems and to achieve the object, the present invention includes a step of forming a first bond coat layer, which is a metal bonding layer, on a base material; a step of disposing a sensor unit including a sensor and a conductive wire on the first bond coat layer; a step of forming a second bond coat layer having a surface roughness higher than that of the first bond coat layer on the first bond coat layer so as to cover at least the sensor unit; and a step of forming a top coat layer on the second bond coat layer.

By virtue of this configuration, the second bond coat layer having a surface roughness higher than that of the first bond coat layer is formed on the first bond coat layer so as to cover the sensor unit, and the top coat layer is formed on the second bond coat layer. For this reason, the degree of adhesion between the second bond coat layer and the top coat layer can be improved. As a result, even when there is a heat elongation difference between the sensor and the conductive wire of the sensor, and the top coat layer, it is possible to prevent the top coat layer from being delaminated from the second bond coat layer and to realize long-term use of the thermal barrier coated component in a high-temperature environment. Therefore, according to the present invention, it is possible to obtain the thermal barrier coated component capable of appropriately monitoring or evaluating soundness on the basis of the thermal boundary conditions detected by the sensor.

Additionally, it is preferable that, in the step of forming the first bond coat layer, the first bond coat layer is formed by either a high velocity oxygen fuel spraying or a low pressure plasma spraying, and in the step of forming the second bond coat layer, the second bond coat layer is formed by an atmospheric plasma spraying.

By virtue of this configuration, the second bond coat layer formed by the atmospheric plasma spraying can be made to include more pores than the first bond coat layer formed by either the high velocity oxygen fuel spraying or the low pressure plasma spraying. As a result, the surface roughness of the second bond coat layer can be made higher than the surface roughness of the first bond coat layer.

Additionally, in the step of disposing the sensor unit, it is preferable that the sensor is sprayed onto and drawn on the first bond coat layer. By virtue of this configuration, the sensor can be easily disposed on the first bond coat layer.

DESCRIPTION OF EMBODIMENTS

Hereinafter, embodiments of a thermal barrier coated component and a method for producing the thermal barrier coated component according to the present invention will be described in detail with reference to the drawings. In addition, the present invention is not limited to this embodiment.

Figure 1:
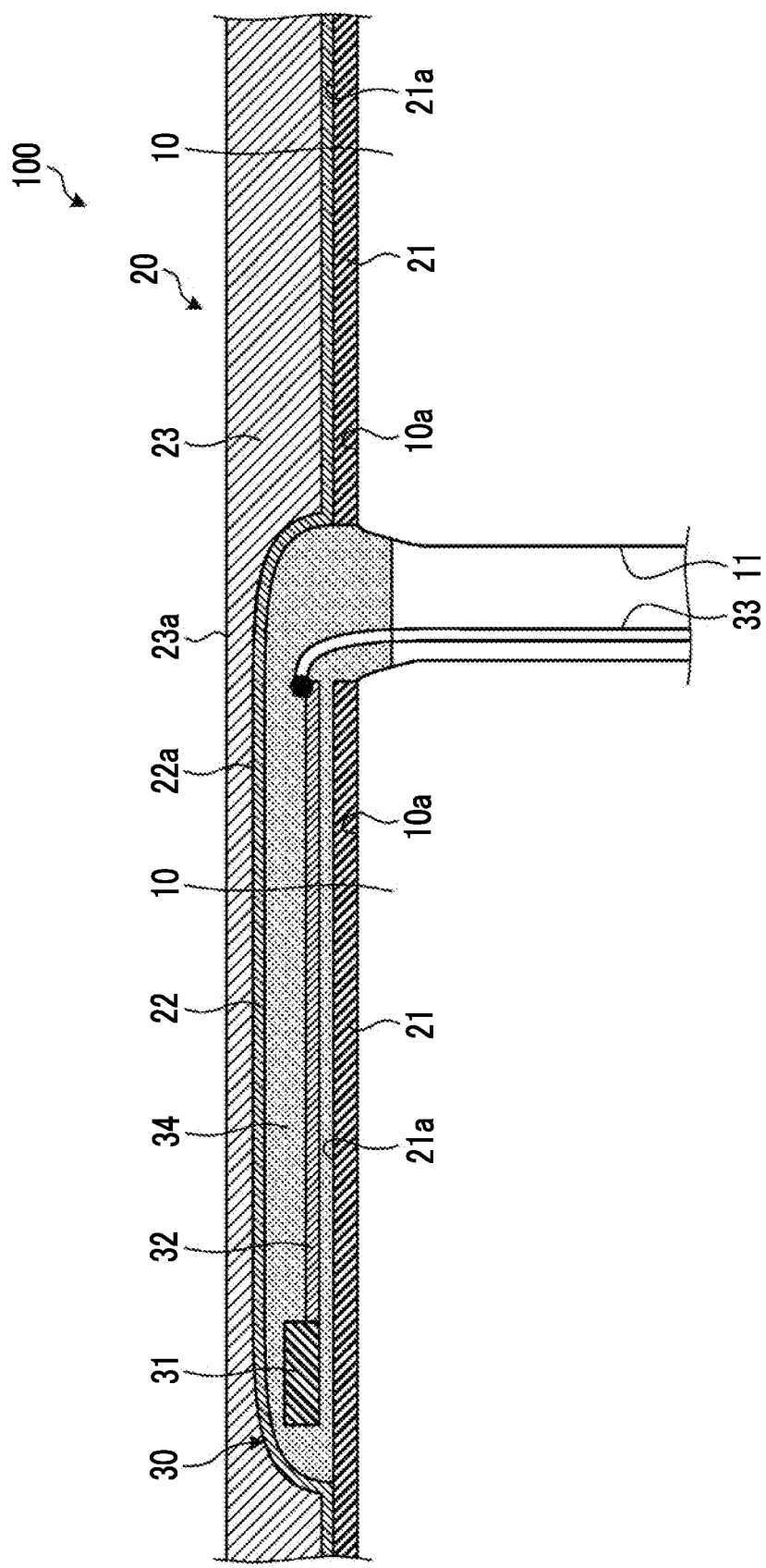
FIG. 1 is a cross-sectional view showing a part of a thermal barrier coated component according to an embodiment.

FIG. 1 is a cross-sectional view showing a part of a thermal barrier coated component according to an embodiment. In the present embodiment, a thermal barrier coated component 100 is a test member for performing various evaluations on components that are used in a high-temperature environment and that are coated with a thermal barrier coating (TBC). The "components coated with a thermal barrier coating" are, for example, a stationary blade, a rotor blade, and a ring segment used for gas turbines, components used for combustion gas passages, or the like. However, the "components coated with a thermal barrier coating" are not limited to the components used in gas turbines and may be components used in high-temperature environments, such as cylinder heads used in turbochargers and wall surfaces of scramjets. Additionally, the thermal barrier coated component 100 may not be a test member for evaluation but may be a "component coated with a thermal barrier coating" itself which is applied to an actual machine and of which the soundness should be monitored.

In the thermal barrier coated component 100, as shown in FIG. 1, a surface 10a of a base material 10 is coated with a thermal barrier coating 20, and a sensor unit 30 is disposed in the thermal barrier coating 20. The base material 10 is formed of, for example, a metallic material, and is formed with a through-hole 11 penetrating from the surface 10a to a surface (not shown) opposite to the surface 10a. The through-hole 11 is provided to pull out a wire cable 33 of the sensor unit 30, which will be described below.

The thermal barrier coating 20 has a first bond coat layer 21, a second bond coat layer 22, and a top coat layer 23.

The first bond coat layer 21 and the second bond coat layer 22 function as bond coat layers that suppress delamination between the base material 10 and the top coat layer 23 and that improve corrosion resistance and oxidation resistance. The first bond coat layer 21 is a metal bonding layer formed on the surface 10a of the base material 10. The first bond coat layer 21 is formed of, for example, an MCrAlY alloy (where M is Co, Ni, or a combination of these elements). In the present embodiment, the first bond coat layer 21 is formed on the surface 10a of the base material 10 by spraying using particles of an MCrAlY alloy or the like as a spraying material. More specifically, the first bond coat layer 21 is formed by either a high velocity oxygen fuel spraying (HVOF) or a low pressure plasma spraying (LPPS).

The second bond coat layer 22 is a metal bonding layer formed on a surface 21a of the first bond coat layer 21 opposite to the base material 10 while covering the sensor unit 30. In the present embodiment, the second bond coat layer 22 is formed over the entire surface of the first bond coat layer 21. The second bond coat layer 22 is formed of the same material as the first bond coat layer 21, for example, an MCrAlY alloy (where M is Co, Ni, or a combination of these elements). The thickness of the second bond coat layer 22 is smaller than the thickness of the first bond coat layer 21. That is, the second bond coat layer 22 is formed to be thinner than the first bond coat layer 21.

In the present embodiment, the second bond coat layer 22 is formed on the surface 21a of the first bond coat layer 21 by spraying using particles of an MCrAlY alloy or the like as a spraying material. More specifically, the second bond coat layer 22 is formed by an atmospheric plasma spraying (APS). Accordingly, the second bond coat layer 22 is formed while more air is entrained compared to the first bond coat layer 21, so that the second bond coat layer 22 includes more pores inside. That is, the second bond coat layer 22 has a higher porosity than the first bond coat layer 21. The surface roughness of the second bond coat layer 22 is higher than that of the first bond coat layer because minute irregularities are easily formed on a surface portion of the second bond coat layer 22 due to the pores. As a result, the degree of adhesion to the top coat layer 23 is improved on a surface 22a of the second bond coat layer 22 opposite to the first bond coat layer 21. The second bond coat layer 22 preferably has a porosity (% by volume) of 0.1% by volume or more and 10.0% by volume or less. On the other hand, the first bond coat layer 21 has a porosity (% by volume) of about 0% by volume or more and 5.0% by volume or less. In addition, the porosity of the first bond coat layer 21 and the second bond coat layer 22 is not limited to this.

The top coat layer 23 is formed on the surface 22a of the second bond coat layer 22 opposite to the first bond coat layer 21. The top coat layer 23 is a layer containing ceramic as a main component. As the ceramic, for example, a material containing zirconia as a main component is used. The top coat layer 23 is formed on the surface 22a of the second bond coat layer 22, for example, by spraying using particles of a zirconia-based material as a spraying material.

More specifically, the top coat layer 23 is formed by the atmospheric plasma spraying. The top coat layer 23 may be formed by a vapor deposition method such as an electron beam physical vapor deposition method.

The sensor unit 30 is disposed in bond coat layers, that is, between the first bond coat layer 21 and the second bond coat layer 22. The sensor unit 30 includes a sensor 31, a conductive wire 32, a wire cable 33, and an insulating layer 34.

The sensor 31 is a sensor that detects thermal boundary conditions for evaluating the thermal barrier coated component 100. The sensor 31 is, for example, a thermocouple sensor, a heat flux sensor, a strain sensor, and a sensor that detects cracks generated in the thermal barrier coating 20 (first bond coat layer 21, second bond coat layer 22, and top coat layer 23). That is, the sensor detects the temperature, heat flux, strain, crack generation timing, and the like of the thermal barrier coating 20, thereby detecting values serving as various thermal boundaries of the thermal barrier coated component 100 used for a long time in a high-temperature environment. The conductive wire 32 extending in a direction along the surface 10a of the base material 10 and the wire cable 33 connected to the conductive wire 32 by spot welding are connected to the sensor 31. The sensor 31, the conductive wire 32, and the wire cable 33 are disposed on the first bond coat layer 21 in a state of being covered with the insulating layer 34 and are covered with the second bond coat layer 22. In the present embodiment, the sensor 31 is drawn on the first bond coat layer 21 via the insulating layer 34 by spraying using particles of a sensor material as a spraying material.

As described above, the base material 10 is formed with the through-hole 11, and the wire cable 33 is pulled out from the through-hole 11 to a side opposite to the surface 10a of the base material 10. The wire cable 33 pulled out from the through-hole 11 is connected to a voltmeter (not shown) disposed outside, and an electromotive force generated by the sensor 31 is output to the voltmeter. Accordingly, various evaluations of the thermal barrier coated component 100 can be performed on the basis of the thermal boundary conditions measured by the sensor 31. Additionally, in a case where the thermal barrier coated component 100 is the "component coated with a thermal barrier coating" itself applied to an actual machine, the soundness of the thermal barrier coated component 100 can be monitored on the basis of the thermal boundary conditions measured by the sensor 31.

Figure 2:
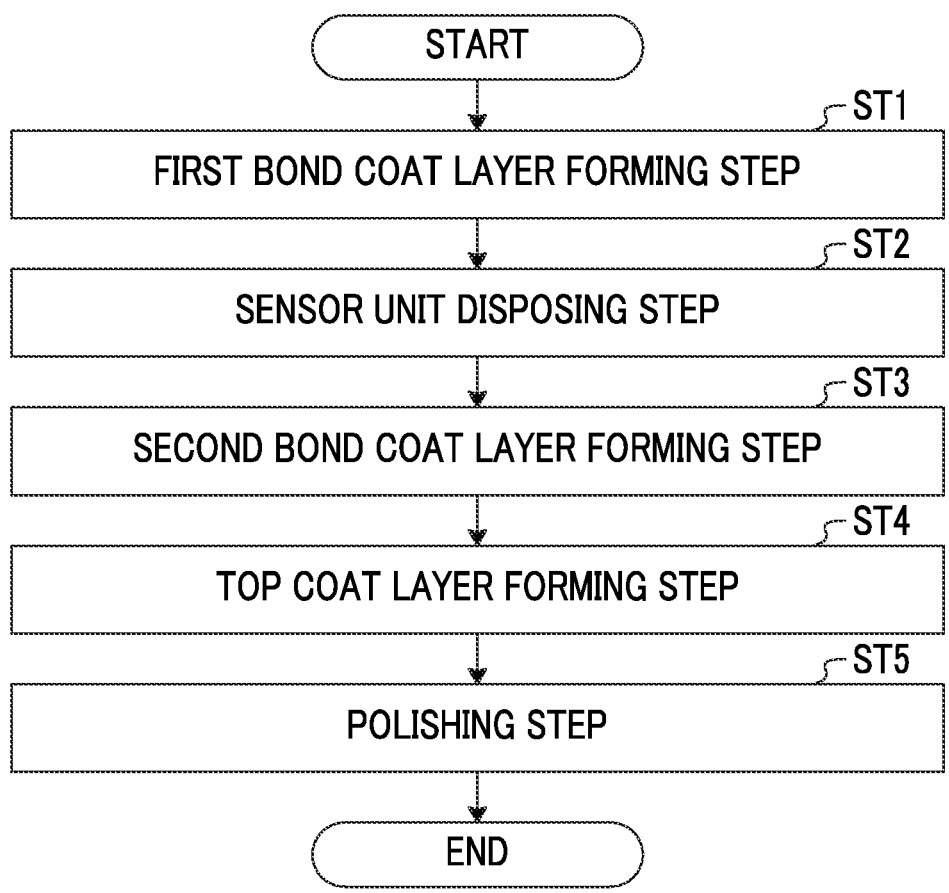
FIG. 2 is a flowchart showing an example of a method for producing the thermal barrier coated component according to the embodiment.
Figure 3:
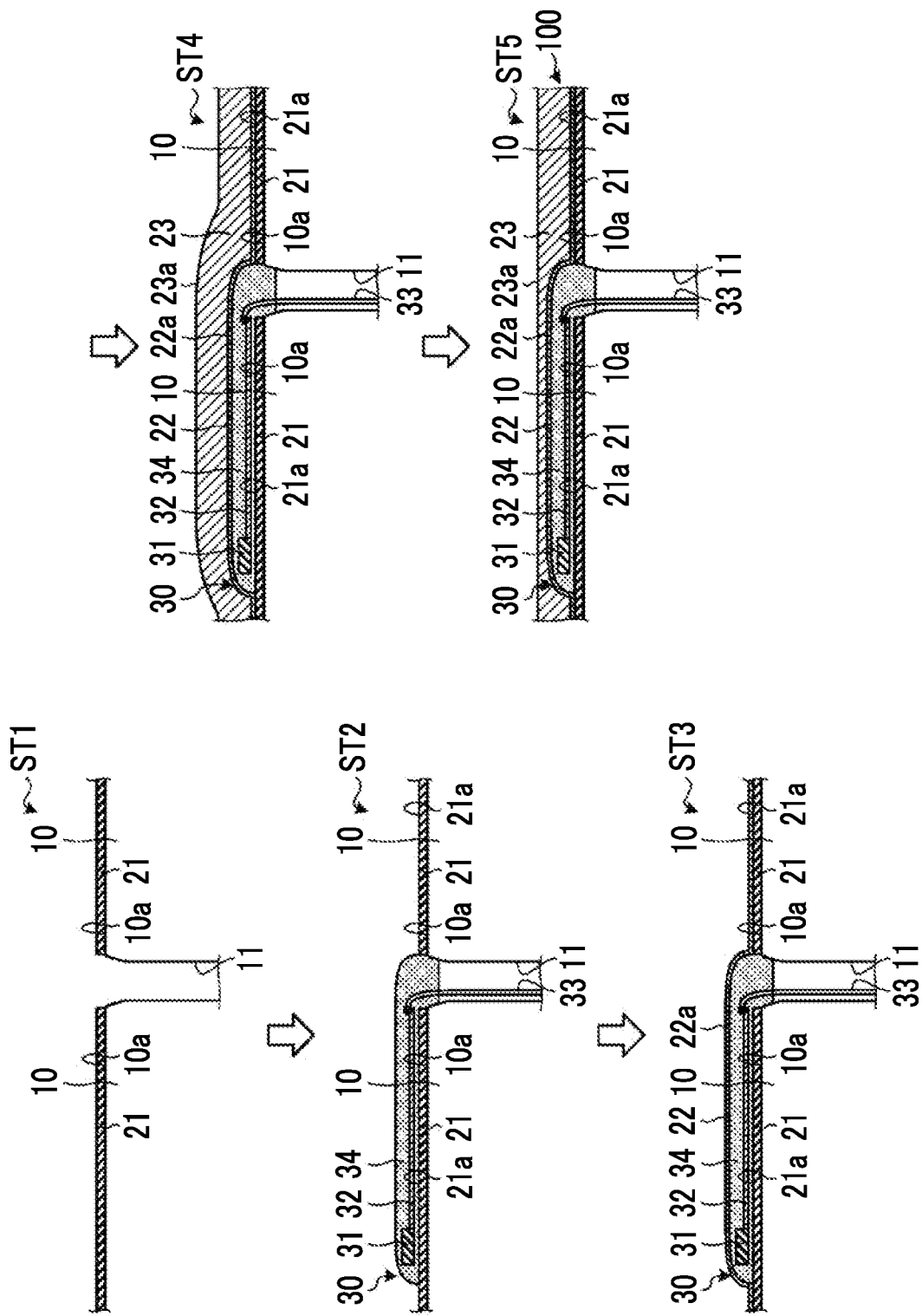
FIG. 3 is an explanatory view schematically showing respective steps shown in FIG. 2.

Next, a method for producing the thermal barrier coated component according to the embodiment will be described with reference to FIGS. 2 and 3. FIG. 2 is a flowchart showing an example of the method for producing the thermal barrier coated component according to the embodiment, and FIG. 3 is an explanatory view schematically showing respective steps shown in FIG. 2. As shown in FIG. 2, the method for producing the thermal barrier coated component according to the embodiment includes a first bond coat layer forming step ST1, a sensor unit disposing step ST2, a second bond coat layer forming step ST3, a top coat layer forming step ST4, and a polishing step ST5.

The first bond coat layer forming step ST1 is a step of forming the first bond coat layer 21 on the base material 10 as shown in FIG. 3. In the first bond coat layer forming step ST1, a film is formed on the surface 10a of the base material 10 by spraying using particles of an MCrAlY alloy or the like as a spraying material. More specifically, the first bond coat layer 21 is formed by the high velocity oxygen fuel spraying or the low pressure plasma spraying. In addition, the through-hole 11 of the base material 10 may be formed in the base material 10 prior to the first bond coat layer forming step ST1 or may be formed as a hole portion penetrating both the first bond coat layer 21 and the base material 10 after the first bond coat layer forming step ST1.

The sensor unit disposing step ST2 is a step of disposing the sensor unit 30 on the first bond coat layer 21. In the sensor unit disposing step ST2, after a part of the insulating layer 34 is formed on the first bond coat layer 21, the sensor 31 is drawn on the first bond coat layer 21 via the insulating layer 34 by spraying using the particles serving as the material of the sensor 31 as a spraying material. Then, the conductive wire 32 is connected to the sensor 31, and the wire cable 33 is spot-welded to the conductive wire 32 to pull out the wire cable 33 from the through-hole 11. After that, by forming the remaining insulating layer 34 around the sensor 31, the conductive wire 32, and the wire cable 33, the sensor unit 30 is disposed on the first bond coat layer 21 as shown in FIG. 3.

The second bond coat layer forming step ST3 is a step of forming the second bond coat layer 22 on the first bond coat layer 21 so as to cover the sensor unit 30. In the second bond coat layer forming step ST3, a film is formed on the entire surface 21a of the first bond coat layer 21 including the top of the sensor unit 30 by spraying using particles of an MCrAlY alloy or the like as a spraying material. More specifically, the second bond coat layer 22 is formed by the atmospheric plasma spraying. As a result, the second bond coat layer 22 includes more pores than the first bond coat layer 21, and minute irregularities are easily formed on a surface portion of the second bond coat layer 22 due to the pores, resulting in higher surface roughness. By the above first bond coat layer forming step ST1 to the second bond coat layer forming step ST3, the first bond coat layer 21 and the second bond coat layer 22 serving as bond coat layers are formed on the base material 10, and the sensor unit 30 is disposed in the bond coat layers (between the first bond coat layer 21 and the second bond coat layer 22).

The top coat layer forming step ST4 is a step of forming the top coat layer 23 on the bond coat layer. In the present embodiment, as described above, the second bond coat layer 22 is formed on the entire surface 21a of the first bond coat layer 21 including the sensor unit 30. For this reason, in the top coat layer forming step ST4, the top coat layer 23 is formed on the second bond coat layer 22. More specifically, the top coat layer 23 is formed on the second bond coat layer 22 by the atmospheric plasma spraying. In addition, the top coat layer 23 may be formed on the second bond coat layer 22 by using the vapor deposition method such as the electron beam physical vapor deposition method.

The polishing step ST5 is a step of polishing a surface 23a of the top coat layer 23 opposite to the bond coat layer to smoothen the surface 23a. The polishing step ST5 can be performed using a polishing tool. Accordingly, the thermal barrier coated component 100 shown in FIG. 1 is formed.

As described above, in the thermal barrier coated component 100 and the method for producing the thermal barrier coated component according to the embodiment, the second bond coat layer 22 having a surface roughness higher than that of the first bond coat layer 21 is formed on the first bond coat layer 21 so as to cover the sensor unit 30, and the top coat layer 23 is formed on the second bond coat layer 22. For this reason, the degree of adhesion between the second bond coat layer 22 and the top coat layer 23 can be improved.

Figure 4:
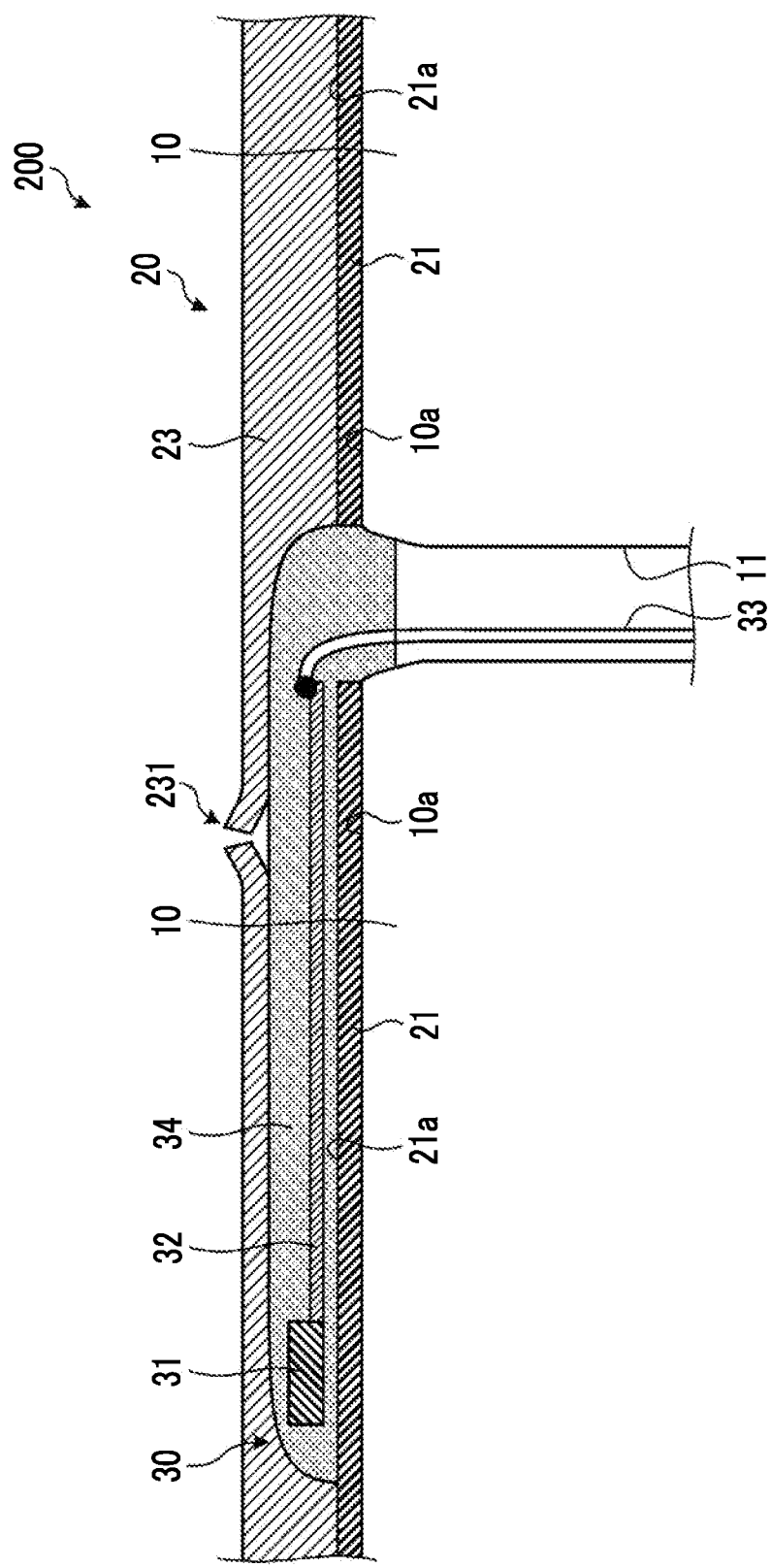
FIG. 4 is a cross-sectional view showing a part of a thermal barrier coated component according to a comparative example.

Here, FIG. 4 is a cross-sectional view showing a part of a thermal barrier coated component according to a comparative example. In a thermal barrier coated component 200 of the comparative example, the second bond coat layer 22 is omitted from the thermal barrier coated component 100 of the embodiment. That is, in the thermal barrier coated component 200, the sensor unit 30 is disposed on the first bond coat layer 21, and the top coat layer 23 is formed on the sensor unit 30 and the first bond coat layer 21. Since the other components of the thermal barrier coated component 200 are the same as those of the thermal barrier coated component 100, the other components will be designated by the same reference signs and the description thereof will be omitted. In a case where the top coat layer 23 is formed on the sensor unit 30 in this way, the degree of adhesion between the top coat layer 23 and the sensor unit 30 is weaker than that of the thermal barrier coated component 100 of the embodiment. For this reason, if the thermal barrier coated component 200 of the comparative example is used for a long time in a high-temperature environment, a heat elongation difference occurs between the sensor 31 and the conductive wire 32 of the sensor 31, and the top coat layer 23, and if the amount of deformation of the top coat layer 23 and the amount of deformation of the sensor unit 30 are imbalanced, there is a possibility that the top coat layer 23 may be buckled and deformed to generate a delaminated portion 231 delaminated from the sensor unit 30.

On the other hand, in the thermal barrier coated component 100 of the embodiment, as described above, the second bond coat layer 22 is interposed between the top coat layer 23 and the sensor unit 30, so that the degree of adhesion between the second bond coat layer 22 and the top coat layer 23 can be improved. As a result, even when there is a heat elongation difference between the sensor 31 and the conductive wire 32 of the sensor 31, and the top coat layer 23, it is possible to prevent the top coat layer 23 from being delaminated from the second bond coat layer 22 and to realize long-term use of the thermal barrier coated component 100 in a high-temperature environment. Therefore, according to the embodiment, it is possible to obtain the thermal barrier coated component 100 capable of appropriately monitoring or evaluating soundness on the basis of the thermal boundary conditions detected by the sensor 31.

Additionally, the second bond coat layer 22 includes more pores than the first bond coat layer 21. By virtue of this configuration, the surface roughness of the second bond coat layer 22 can be made higher than the surface roughness of the first bond coat layer 21. In addition, the surface roughness of the second bond coat layer 22 may be higher than that of the first bond coat layer 21 regardless of the porosity, and may be capable of improving the degree of adhesion to the top coat layer 23.

Additionally, the second bond coat layer 22 is thinner than the first bond coat layer 21. By virtue of this configuration, even when the second bond coat layer 22 is provided, it is possible to suppress increase of thickness of the entire layers formed on the base material 10.

Additionally, the first bond coat layer forming step ST1 forms the first bond coat layer 21 via the high velocity oxygen fuel spraying and the low pressure plasma spraying, and the second bond coat layer forming step ST3 forms the second bond coat layer 22 via the atmospheric plasma spraying.

By virtue of this configuration, the porosity of the second bond coat layer 22 formed by the atmospheric plasma spraying can be increased as compared to the first bond coat layer 21 formed by the high velocity oxygen fuel spraying and the low pressure plasma spraying. As a result, the surface roughness of the second bond coat layer 22 can be made higher than the surface roughness of the first bond coat layer 21. In addition, the first bond coat layer 21 and the second bond coat layer 22 may be formed by other techniques as long as the surface roughness of the second bond coat layer 22 is higher than that of the first bond coat layer 21, and the degree of adhesion to the top coat layer 23 can be improved. For example, by using a material different from that of the first bond coat layer 21 for the second bond coat layer 22 or by applying a surface treatment to the surface 22a of the second bond coat layer 22, the surface roughness of the second bond coat layer 22 may be made higher than the surface roughness of the first bond coat layer 21.

Additionally, in the sensor unit disposing step ST2, the sensor 31 is sprayed onto and drawn on the first bond coat layer 21. By virtue of this configuration, the sensor 31 can be easily disposed on the first bond coat layer 21. In addition, the sensor 31 and the conductive wire 32 may be disposed by other techniques as long as the sensor 31 and the conductive wire 32 are provided between the first bond coat layer 21 and the second bond coat layer 22 via the insulating layer 34.

In the present embodiment, the second bond coat layer 22 is formed over the entire surface of the first bond coat layer 21, but the second bond coat layer 22 may be formed at least in a range covering the sensor unit 30. In that case, the top coat layer 23 may be formed on the second bond coat layer 22 that covers the sensor unit 30 and on a portion of the first bond coat layer 21 on which the second bond coat layer 22 is not formed.

REFERENCE SIGNS LIST

10: Base material
10a, 21a, 22a, 23a: Surface
11: Through-hole
20: Thermal barrier coating
21: First bond coat layer
22: Second bond coat layer
23: Top coat layer
30: Sensor unit
31: Sensor
32: Conductive wire
33: Wire cable
34: Insulating layer
100: Thermal barrier coated component

The invention claimed is:

1. A thermal barrier coated component comprising:
a base material;
a first bond coat layer that is a metal bonding layer formed on the base material;
a sensor unit disposed on the first bond coat layer and including a sensor and a conductive wire;
a second bond coat layer that is formed on the first bond coat layer so as to cover at least the sensor unit such that the sensor is arranged between the first bond coat layer and the second bond coat layer, wherein the second bond coat layer has a surface roughness higher than that of the first bond coat layer; and
a top coat layer that is formed on the second bond coat layer.

2. The thermal barrier coated component according to claim 1,
wherein the second bond coat layer includes more pores than the first bond coat layer.

3. The thermal barrier coated component according to claim 2, wherein the first bond coat layer has a porosity of 0% by volume or more and 5.0% by volume or less, and
the second bond coat layer has a porosity of 0.1% by volume or more and 10.0% by volume or less.

4. The thermal barrier coated component according to claim 1,
wherein the sensor is any one of a thermocouple sensor, a heat flux sensor, a strain sensor, and a sensor that detects a crack generated in the first bond coat layer, the second bond coat layer, and the top coat layer.

5. The thermal barrier coated component according to claim 1,
wherein the second bond coat layer is thinner than the first bond coat layer.

6. A method for producing a thermal barrier coated component, comprising:
forming a first bond coat layer, which is a metal bonding layer, on a base material;
disposing a sensor unit including a sensor and a conductive wire on the first bond coat layer;
forming a second bond coat layer having a surface roughness higher than that of the first bond coat layer on the first bond coat layer so as to cover at least the sensor unit such that the sensor is arranged between the first bond coat layer and the second bond coat layer; and
forming a top coat layer on the second bond coat layer.

7. The method for producing a thermal barrier coated component according to claim 6,
wherein in the forming of the first bond coat layer, the first bond coat layer is formed by either a high velocity oxygen fuel spraying or a low pressure plasma spraying, and
in the forming of the second bond coat layer, the second bond coat layer is formed by an atmospheric plasma spraying.

8. The method for producing a thermal barrier coated component according to claim 6,
wherein the disposing of the sensor unit includes drawing the sensor on the first bond coat layer by spraying.

* * * * *